(12) United States Patent
Hayami

(10) Patent No.: US 8,892,796 B2
(45) Date of Patent: Nov. 18, 2014

(54) IMAGE FORMING APPARATUS AND CONTROL METHOD THEREOF

(71) Applicant: Canon Kabushiki Kaisha, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 13/781,421

(22) Filed: Feb. 28, 2013

(65) Prior Publication Data

US 2013/0235405 A1 Sep. 12, 2013

(30) Foreign Application Priority Data

Mar. 6, 2012 (JP) .................................. 2012-048856

(51) Int. Cl.
*G06F 3/06* (2006.01)
*G06F 9/445* (2006.01)
*G06F 13/00* (2006.01)
*H04N 1/00* (2006.01)

(52) U.S. Cl.
CPC ........ *H04N 1/00938* (2013.01); *H04N 1/00344* (2013.01); *H04N 1/00928* (2013.01); *G06F 8/61* (2013.01); *H04N 2201/0094* (2013.01)
USPC ............. 710/72; 710/2; 710/5; 710/8; 710/62

(58) Field of Classification Search
None
See application file for complete search history.

(56) References Cited

U.S. PATENT DOCUMENTS

2009/0129692 A1* 5/2009 Shikata et al. ................. 382/254
2012/0263432 A1* 10/2012 Shore ............................ 386/230

FOREIGN PATENT DOCUMENTS

JP 2010198598 A 9/2010

* cited by examiner

*Primary Examiner* — Scott Sun
(74) *Attorney, Agent, or Firm* — Canon U.S.A., Inc., IP Division

(57) ABSTRACT

In a case where an application whose setting value is required to be operated cannot be suspended, a setting value operation service of a multifunction peripheral (MFP) stores requested operation content in a temporary region of a hard disk drive (HDD)/flash memory. The setting value operation service stores in the HDD/flash memory an execution instruction file for executing the requested operation at a restart of the MFP, and reserves the operation to be executed after a restart. When the MFP is restarted, an application management unit changes start-up order of programs according to the execution instruction file so that start-up of the setting value operation service is performed before start-up of the operation target application, and starts the programs according to the changed start-up order. Further, in start-up processing, the restarted setting value operation service operates the setting value of the operation target application according to the setting information.

11 Claims, 16 Drawing Sheets

FIG. 5

```
<?xml version="1.0" encodeing="UTF-8" ?>
< Setting >
   < AppInfo AppID="12345678-1000-00f000s5ba6d" />         ~501
   < Data Entry >
      < Data Name="Font" >
         < Property>
            < Type > String </ Type >
            < Value > Gothic </ Value >                    ~502
         < /Property>
      </ Data>

< Data Name="Font_Color" >
         < Property>
            < Type > String </ Type >
            < Value > Black </ Value >                     ~503
         < /Property>
      </ Data>

< Data Name="Font_Size" >
         < Property >
            < Type > String </ Type >
            < Value > 10 </ Value >                        ~504
         < /Property>
      </ Data>
   </ Date Entry >
</ Setting >
```

500

IMAGE FORMING APPARATUS AND CONTROL METHOD THEREOF

BACKGROUND OF THE INVENTION

1. Field of the Invention

The present invention relates to an image forming apparatus and a control method thereof.

2. Description of the Related Art

In recent years, there has been provided a technique enabling an information distribution apparatus to operate a setting value of an application program (hereinafter referred to as "application") installed in a multifunction peripheral such as an image forming apparatus by using a communication protocol for a web service.

Japanese Patent Application Laid-Open No. 2010-198598 discusses a technique in which an information distribution apparatus transmits application setting information including a setting value of an application that is installed in a multifunction peripheral to the multifunction peripheral, and the setting value included in the application setting information can be reflected in the multifunction peripheral.

An application setting receiving module of the multifunction peripheral receives the application setting information from the information distribution apparatus, and requests the application executed by the multifunction peripheral to reflect the setting information. The requested application reflects the setting information received from the application setting receiving module to itself.

In a case where the operation target application on which the setting information is to be reflected is being executed, rewriting the setting information during the execution may have an unexpected influence on the application. Therefore, the setting information may desirably be rewritten after the application is temporarily suspended.

However, not all the applications can be suspended, and in practice, there are some applications which should not be suspended. A so-called log-in application designed for logged-in user management may be taken as an example of such an application.

The log-in application should not be suspended because the log-in application may receive an inquiry on log-in context from an application at anytime during a log-in period.

In addition, even if the application is a type of application that can be suspended, there may be a case where the application cannot be suspended when it is to be suspended because suspension thereof is unsuccessful.

If the setting information of the application is rewritten under the above-described situation, a rewriting operation of the setting information will be performed while the application is being executed. Therefore, there is a possibility that the rewriting operation thereof may have an unexpected influence on the performance of the application. Accordingly, depending on the situation, the operation for rewriting the setting information has to be executed at a limited timing so as to prevent such an unexpected influence.

SUMMARY OF THE INVENTION

The present invention is directed to an image forming apparatus and a control method thereof capable of safely and reliably executing setting value operations (distribution, acquisition, and deletion) of an application that should not be suspended or failed to be suspended.

According to an aspect of the present invention, an image forming apparatus capable of executing a plurality of programs including at least one application and a setting value operation service for executing a setting value operation of the application includes a determination unit configured to determine whether the application serving as an operation target can be suspended when an operation of a setting value of the application is requested, a reservation unit configured to store the requested operation content in a non-volatile storage region and store execution instruction information, which is used to perform the requested operation at a restart of the image forming apparatus, in a non-volatile storage region readable during the restart processing, in a case where the determination unit determines that the operation target application is cannot be suspended, and a change unit configured to change start-up order of the program according to the execution instruction information so that the setting value operation service is performed before the operation target application when the image forming apparatus is restarted, wherein when the image forming apparatus is restarted, the setting value operation service is started and operates a setting value of the operation target application according to the operation content.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating a configuration example of application setting information of an application that supports a remote setting operation.

DESCRIPTION OF THE EMBODIMENTS

Various exemplary embodiments, features, and aspects of the invention will be described in detail below with reference to the drawings.

In the present exemplary embodiment, processing of a management apparatus connected to a network operates a setting value of an application installed in a multifunction peripheral such as an image forming apparatus will be described.

Figure 1:
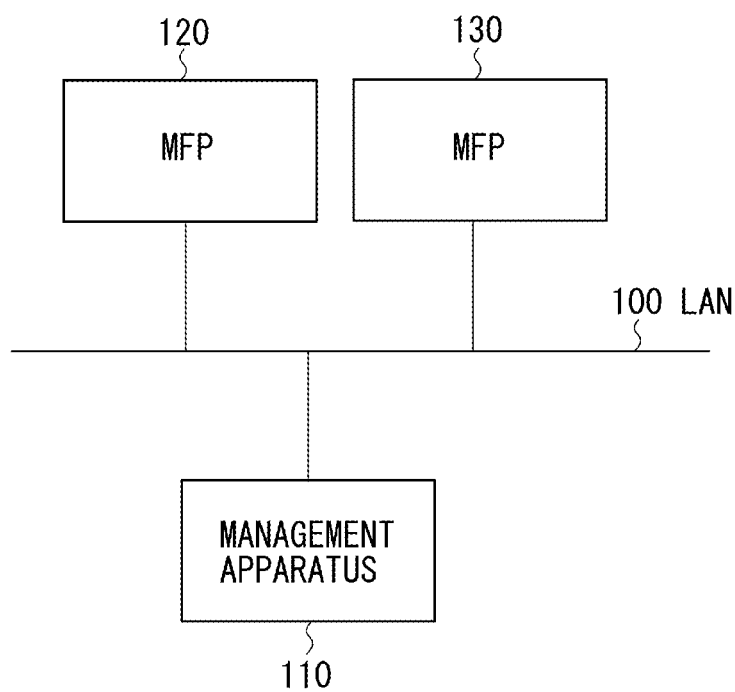
FIG. 1 is a block diagram illustrating an example of an entire configuration of a management system in which an image forming apparatus according to an exemplary embodiment of the present invention and a management apparatus are operating.

FIG. 1 is a block diagram illustrating an example of an entire configuration of a management system in which an image forming apparatus and a management apparatus operate, according to an exemplary embodiment of the present invention.

A management apparatus 110 according to the present exemplary embodiment is illustrated in FIG. 1. Multifunction peripherals (MFPs) 120 and 130 exemplify image forming apparatuses according to the present exemplary embodiment. The management apparatus 110, the MFP 120, and the MFP 130 are connected to each other through a network (local area network (LAN)) 100 so as to be able to communicate with each other.

Figure 2:
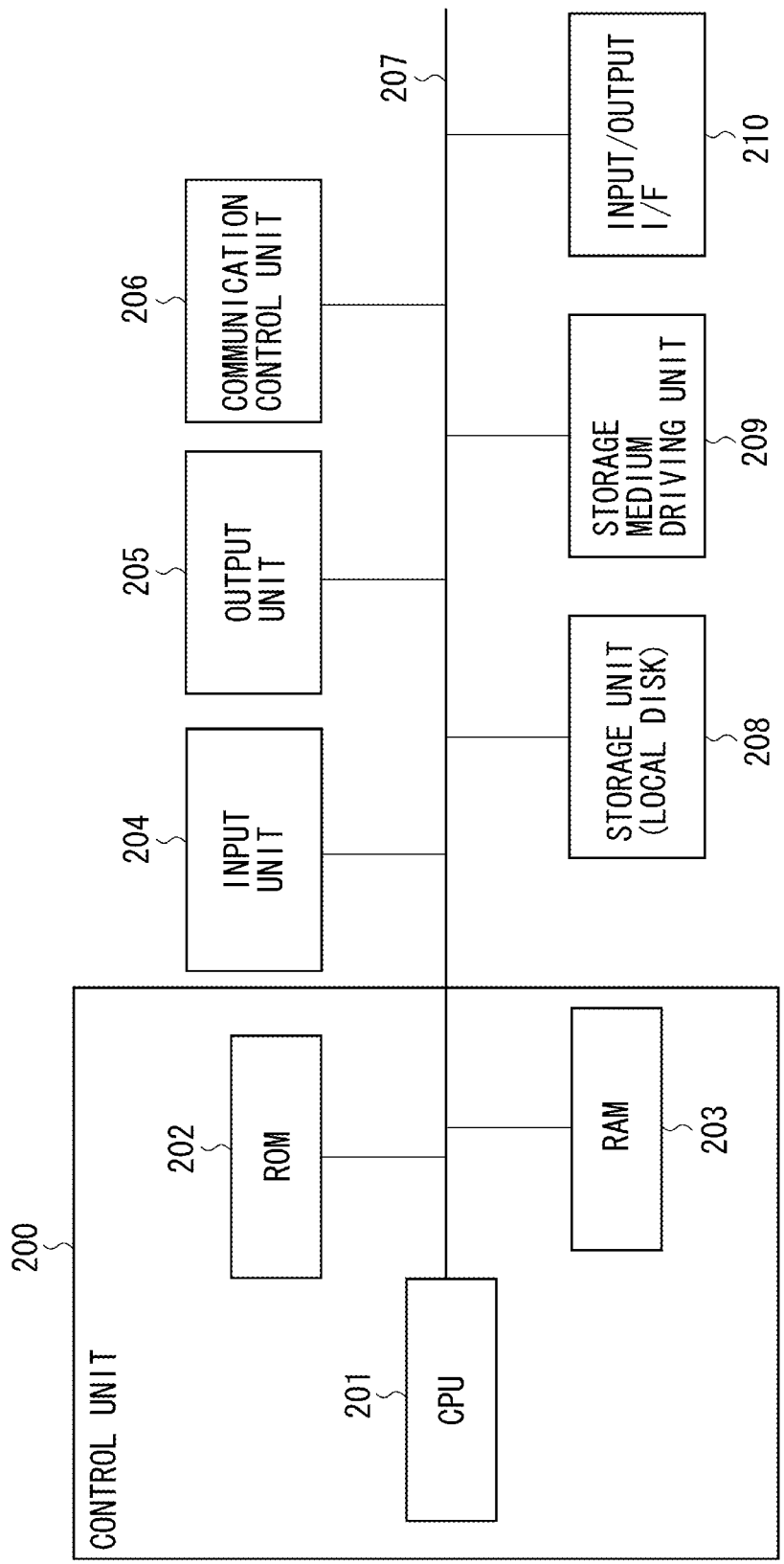
FIG. 2 is a block diagram illustrating an example of a hardware internal configuration of a management apparatus 110.

FIG. 2 is a block diagram illustrating an example of a hardware internal configuration of the management apparatus 110. The management apparatus 110 according to the present exemplary embodiment is realized on a personal computer (PC). Therefore, the management apparatus 110 includes the same configuration t as that of a general-purpose computer.

As illustrated in FIG. 2, the management apparatus 110 is configured in such a manner that an input unit 204, an output unit 205, a communication control unit 206, a storage unit 208, a storage medium driving unit 209, and an input/output interface (I/F) 210 are connected to a control unit 200 via a bus line 207. Transmission and reception of a data signal and a control signal between the control unit 200 and other constituent elements are performed via the bus line 207.

The control unit 200 is configured of a central processing unit (CPU) 201, a read only memory (ROM) 202, and a random access memory (RAM) 203. According to a predetermined program, the CPU 201 performs various kinds of calculations, information processing, and a control of the entire management apparatus 110.

The ROM 202 stores various kinds of programs, data, and parameters for the CPU 201 to execute various kinds of calculations and controls. The CPU 201 can read programs, data, and parameters from the ROM 202. However, the CPU 202 cannot rewrite or delete the programs, the data, and the parameters.

The RAM 203 is a storage device which the CPU 201 can randomly access to and use as a working memory. The CPU 201 can write and delete programs and data into/from the RAM 203.

The input unit 204 is configured of input devices such as a keyboard and a mouse. The keyboard serves as a device for inputting information such as characters and numerals with respect to a terminal device. The keyboard includes a character keypad for inputting Japanese katakana and alphabetical characters, a numerical keypad for inputting numerals, various kinds of function keys, a cursor key, and other keys.

For example, a user can input information relating to a setting value to be distributed to set to the MFPs 120 and 130, or information relating to a setting value to be deleted from the MFPs 120 and 130 through the keyboard. The mouse serves as a pointing device.

When a user operates a terminal device using a graphical user interface (GUI), the user can input predetermined information by clicking a button or an icon displayed on a display device with a mouse.

The output unit 205 is configured of a display device and a printing device, for example. The display device is a device for displaying information on a display screen of a cathode ray tube (CRT) display, a liquid crystal display, or a plasma display. The display device can display an input result of the keyboard or the mouse as well as a screen provided by software (user interface).

The printing device is configured of a printer device. Various kinds of printers such as an ink jet printer, a laser printer, a thermal transfer printer, and a dot printer are included in the printer device. The printing device can print text or an image serving as an output result on a printing medium such as a sheet of paper.

The communication control unit 206 establishes and maintains communications between the management apparatus 110, the MFP 120, and the MFP 130.

The storage unit 208 is configured of a readable-writable storage medium, and a driving unit for reading and writing a program or data with respect to the readable-writable storage medium. The storage unit 208 can be read and written by a computer. A hard disk is mainly employed as a storage medium. However, the storage medium can be configured of other readable-writable storage media such as a magneto optical disk, a magnetic disk, or a semiconductor memory.

A program of MFP management software according to the present exemplary embodiment is stored in the storage unit 208. The program of the MFP management software serves as an operating entity in the entire descriptions given below. In addition, a communication program and an operating system (OS) are stored in the storage unit 208. The communication program controls the communication control unit 206 and maintains communication through the internet. The OS serves as basic software for the management apparatus 110 to perform memory management and file input/output management.

The storage medium driving unit 209 is a driving device for driving a removable storage medium to read and write data. A magneto optical disk, a magnetic disk, a magnetic tape, a semiconductor memory, or a compact disc read only memory (CD-ROM) can be given as an example of the removable storage medium.

The MFP management program according to the present exemplary embodiment may be stored and supplied in a form of the storage medium such as a CD-ROM. In that case, the storage medium driving unit 209 reads the MFP management program from the storage medium and installs the MFP management program in the storage unit 208.

The input/output interface 210 is configured of a serial interface or other interfaces compliant with other standards. A function of the management apparatus 110 can be expanded by connecting external devices according to the interface to the input/output interface 210. A hard disk serving as a storage device, a speaker, or a microphone can be given as an example of the external device.

Figure 3:
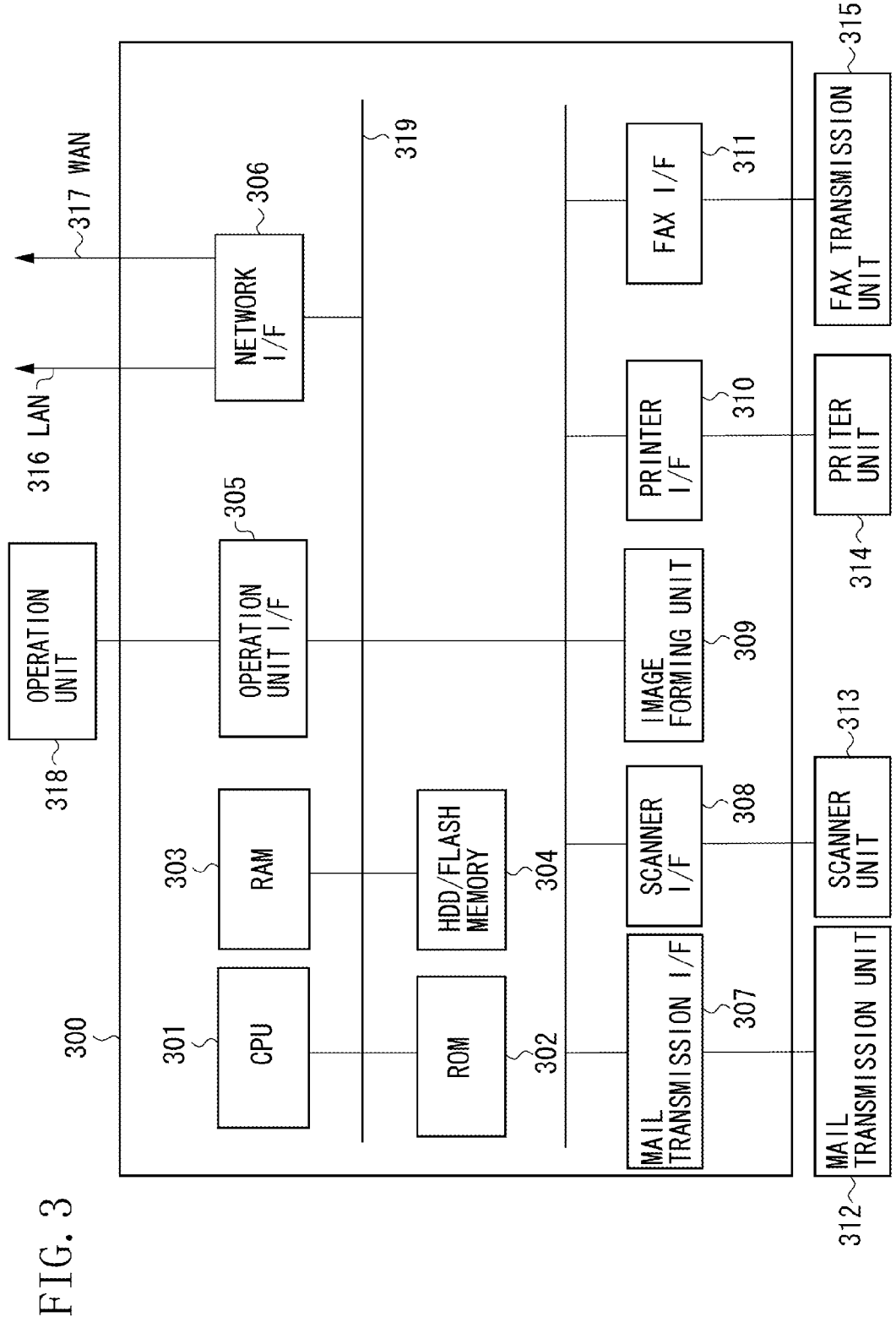
FIG. 3 is a block diagram illustrating an example of an internal configuration of a multifunction peripheral 120 and 130.

Referring to FIG. 3, an internal configuration of the MFP including a print function, a scan function, and a network communication function will be described as an example of the MFPs 120 and 130. FIG. 3 is a diagram illustrating an example of the internal configuration of the MFPs 120 and 130.

In FIG. 3, a controller 300 serves as a controller of the MFPs 120 and 130. The controller 300 is electrically connected to a scanner unit 313 and a printer unit 314. The controller 300 is further connected to the management apparatus 110 via a LAN 316. With this, the controller 300 can input and output image data and device information thereto.

In the controller 300, based on a control program stored in a ROM 302, a CPU 301 integrally controls the access between various kinds of devices connected thereto. Further, the CPU 301 integrally controls various types of processing executed in the controller 300.

A computer readable boot program of the MFPs 120 and 130 is stored in the ROM 302.

A RAM 303 serves as a system work memory for the CPU 301 to operate, and also serves as a memory to store the image data temporarily. The RAM 303 is configured of a Ferroelectric Random Access Memory (FRAM), a static random access memory (SRAM), or a dynamic random access memory (DRAM). The stored content is held within the FRAM and the SRAM after the power is turned off, whereas the stored content is deleted from the DRAM when the power is turned off.

A hard disk drive (HDD)/flash memory 304 is a hard disk drive (HDD) or a flash memory capable of storing system software (a program of software module illustrated in FIG. 6 described below) or image data. In addition, other non-volatile storage devices may be employed as the HDD/flash memory 304.

An operation unit I/F 305 is an interface unit for connecting a system bus 319 and an operation unit 318. The operation unit I/F 305 receives image data to be displayed on the operation unit 318 from the system bus 319, and outputs the image data to the operation unit 318. Further, the operation unit I/F 305 outputs the information input from the operation unit 318 to the system bus 319.

A network I/F 306 connects to the LAN 316, a wide area network (WAN) 317, and the system bus 319 to input and output information.

A mail transmission I/F 307 transmits the image data received from an image forming unit 309 to a designated transmission destination through a mail transmission unit 312 and the LAN 316 (or the WAN 317).

The scanner I/F 308 performs data correction, data processing, and data editing with respect to the image data received from the scanner unit 313. Further, the scanner I/F 308 determines whether the received image data is a color document or a black and white document, a text document or a photographic document. Then, the scanner I/F 308 associates the determination result with the image data. The information associated with the image data is referred to as "attribute data". The image forming unit 309 performs orientation change, image compression, and image decompression of the image data.

The printer I/F 310 receives the image data sent from the image forming unit 309, refers to the attribute data associated with the image data, and performs image forming processing on the image data. After the image forming processing, the image data is output to the printer unit 314.

A fax I/F 311 transmits the image data sent from the image forming unit 309 to a designated transmission destination through a fax transmission unit 315 and the LAN 316 (or the WAN 317).

In addition, a user instruction to the MFPs 120 and 130 and information presentation to the user may be performed through the operation unit 318, or the management apparatus 110 connected thereto via the LAN 316.

Figure 4:
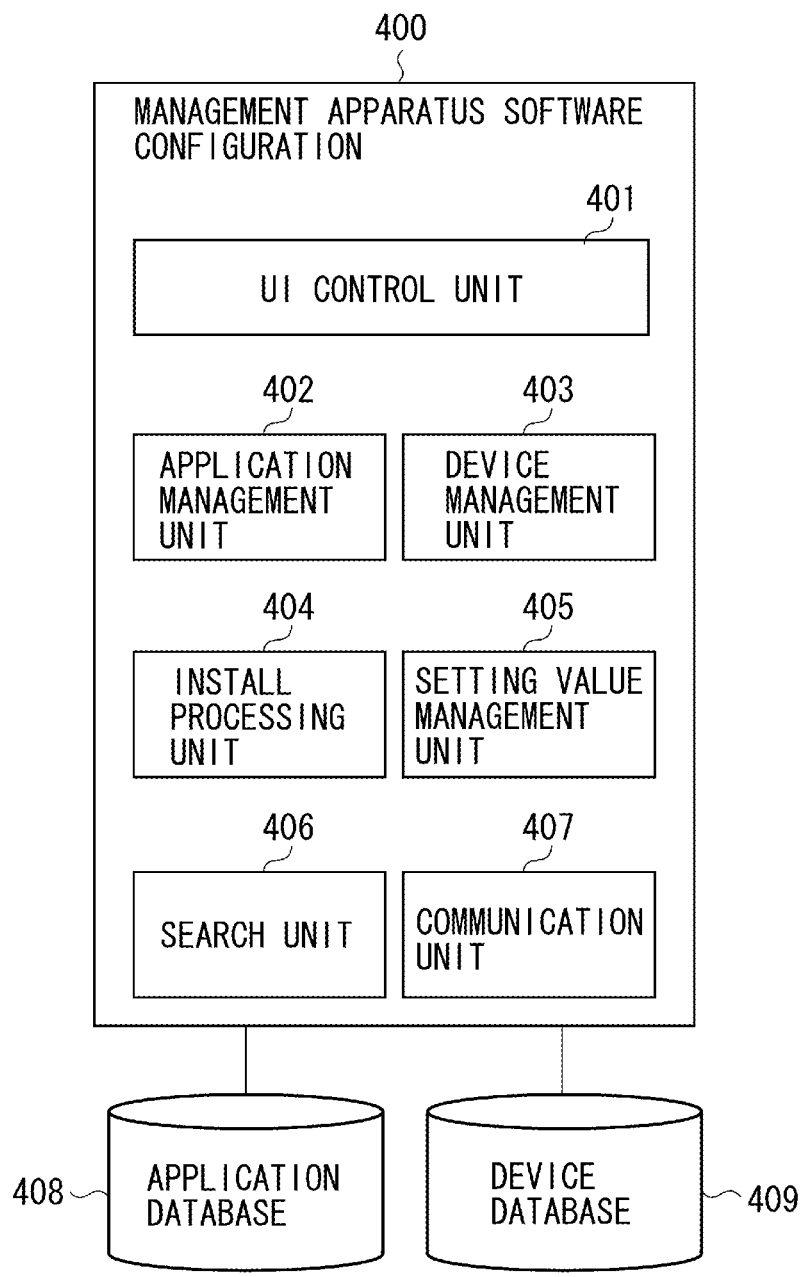
FIG. 4 is a block diagram illustrating a configuration example of the software operating on the management apparatus 110.

FIG. 4 is a diagram illustrating a configuration example of the software operating on the management apparatus 110.

In FIG. 4, MFP management software 400 operates on the management apparatus 110. The MFP management software 400 is realized by the CPU 201 of the management apparatus 110 reading and executing a computer readable program stored in the storage unit 208.

A user interface (UI) control unit 401 provides a graphical user interface (GUI) for an administrator of the MFPs 120 and 130 to operate the MFP management software 400. The GUI is configured to be displayed on the output unit 205 included in the management apparatus 110. In addition, by employing a hypertext transfer protocol (HTTP), the GUI can be configured as a web application capable of being used by other client PC.

An application management unit 402 manages the information of an application file registered by the user. In the same manner as with the cabinet (CAB) file, a Java™ archive file (i.e., JAR file), and a ZIP file, the application file is configured of one file by compressing a plurality of files.

Further, the application management unit 402 analyzes the information associated with the application, extracts application-associated information such as an application name, an application ID, and a version, and stores the application-associated information and the application file in an application database 408.

The device management unit 403 searches the MFPs connected to the network through a search unit 406. The MFPs can be searched by transmitting a search request packet such as a service location protocol (SLP) or a simple network management protocol (SNMP).

The device management unit 403 further can acquire details of the information of the MFP found through the searching processing. The details of the information of the MFP include a model name, a serial number, capacity, a status, and information for the installed application (e.g., an application name, an application ID, and a version).

The device management unit 403 stores the location information (IP address) of the MFP and the information acquired from the MFP in a device list disposed on a device database 409. A user can browse the information registered in the device database 409 through the UI control unit 401.

An install processing unit 404 receives an instruction from the UI control unit 401, connects to the MFP via the communication unit 407, and executes processing for installing the application in the MFP. Further, the install processing unit 404 executes processing for starting or suspending the installed application.

In the processing for installing the application in the MFP, the install processing unit 404 transmits the application program and an installer program thereof to the MFPs 120 and 130, so that the MFPs 120 and 130 can execute the installer program.

A setting value management unit 405 operates a setting value of the application installed in the MFP via the communication unit 407. The setting value management unit 405 can collectively operate the setting information including a plurality of setting values. Further, in the present exemplary embodiment, it is assumed that the setting value management unit 405 realizes the operation of the application setting value by employing the web service using the HTTP and a simple object access protocol (SOAP). However, the operation of the application setting value may be realized by using other communication protocols.

The information of the application setting value acquired from the MFP by the setting value management unit 405 is stored in the application database 408. The user can browse the information registered in the application database 408 through the UI control unit 401.

When the information of the application setting value is distributed to the MFP, the information of the setting value selected by the user through the UI control unit 401 is distributed from among the setting values stored in the application database 408.

An application list indicating the applications installed in the MFP is registered in the application database 408. Further, a device list indicating a list of the MFPs searched by the management apparatus 110 is registered in the device database 409.

FIG. 5 is a diagram illustrating an example configuration of the application setting information of the application complying with the remote setting.

The FIG. 5 includes an application setting information 500. The application setting information 500 (hereinafter, simply referred to as "setting information 500") is expressed in the extensible markup language (XML) format.

In the present exemplary embodiment, the setting information 500 is expressed in the XML format because the employed communication protocol is the HTTP and the SOAP. However, the setting information 500 can be expressed in another format. Each item illustrated in the example of the application setting information 500 in FIG. 5 will be described below.

A region enclosed by "<AppInfo>" tag is an application information description region 501. A value of an application ID for the application relating to the setting information 500 is described in an AppID attribute of the <AppInfo> tag. In FIG. 5, a value "12345678-1000-00f000s5ba6d" is described as the AppID attribute of the <AppInfo> tag of the application information description region 501.

Items enclosed by "<Data>" tag are application setting values 502 through 504. An application setting value name is described in a Name attribute of the <Data> tag. Further, information of a value type for "<Value>" tag is described in "<Type>" tag, while an application setting value for each of the setting items is described in the <Value> tag.

In the application setting value 502, "Font" is described as a Name attribute of the <Data> tag, "String" is described as a value of the <Type> tag, and "Gothic" is described as a value of the <Value> tag.

Further, in the application setting value 503, "Font_Color" is described as a Name attribute of the <Data> tag, "String" is described as a value of the <Type> tag, and "Black" is described as a value of the <Value> tag.

Furthermore, in the application setting value 504, "Font_Size" is described as a Name attribute of the <Data> tag, "String" is described as a value of the <Type> tag, and "10" is described as a value of the <Value> tag respectively.

The setting information 500 illustrated in FIG. 5 includes the application ID, and is expressed in the XML format. Therefore, the boundary of each item or the boundary of the entire setting information can be identified by interpreting the tags. Accordingly, if these defined tags can be interpreted, the corresponding application or a setting value operation service 607 (described below with reference to FIG. 6) can operate the setting value.

The application setting information 500 illustrated in FIG. 5 exemplifies the content distributed when a distribution operation of the application setting information is performed. In a case where an acquisition operation of the application setting information is performed, it is possible to designate which setting data to be acquired by describing similar content in the XML format. Further, in a case where a deletion operation of the application setting information is performed, it is also possible to designate which setting data to be deleted by describing similar content in the XML format.

Figure 6:
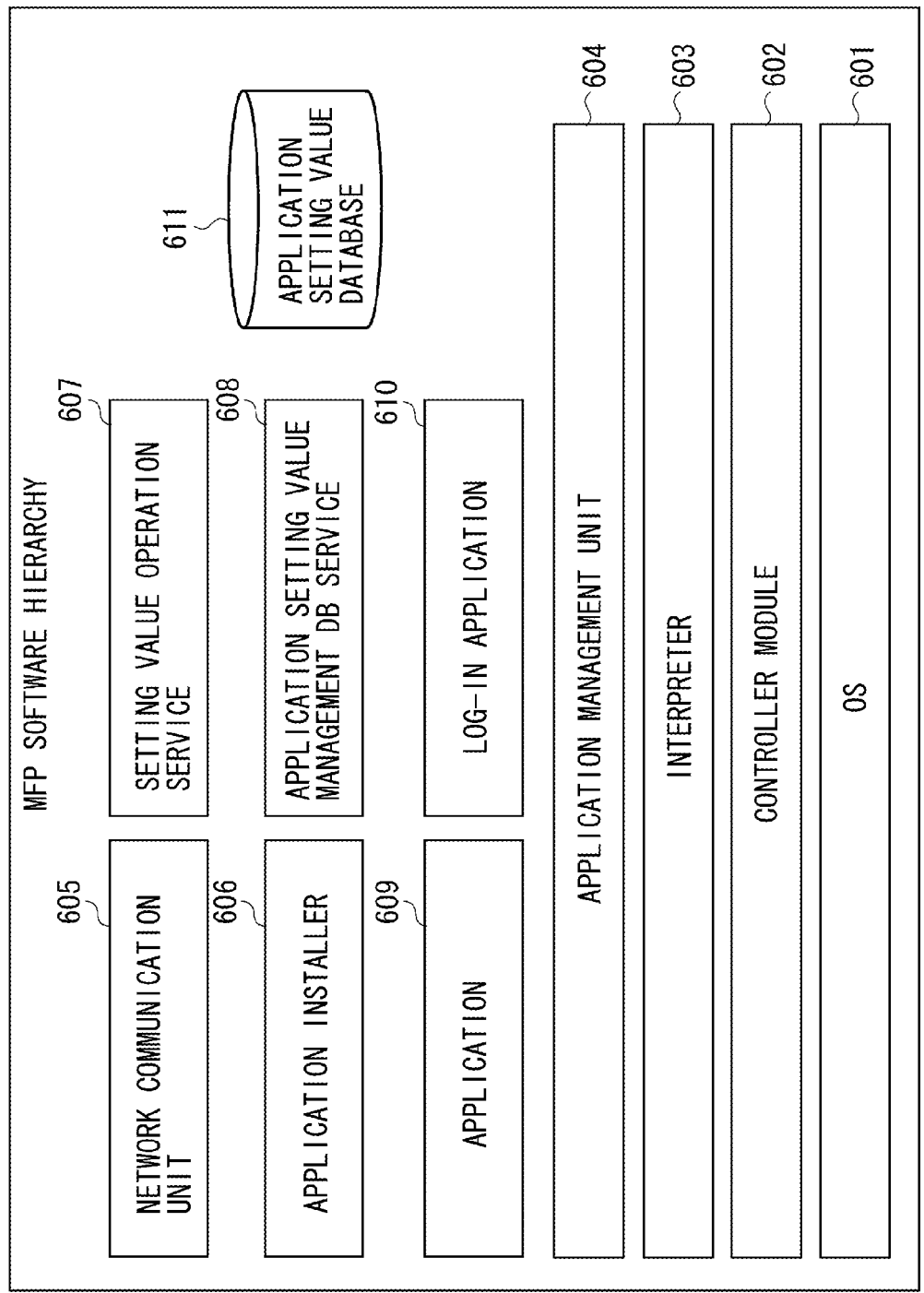
FIG. 6 is a block diagram illustrating a software module hierarchy of the multifunction peripherals 120 or 130.

FIG. 6 is a diagram illustrating a software module hierarchy of the MFPs 120 and 130. The software module of the MFPs 120 and 130 is realized by the CPU 301 of the MFPs 120 and 130 reading and executing the computer readable program stored in the HDD/flash memory 304.

As illustrated in FIG. 6, the software module of the MFP includes an operating system (OS) 601. A controller module 602 for controlling various kinds of devices is disposed on the upper level of the OS 601, and an interpreter 603 for sequentially executing a program such as an application program is further disposed thereupon.

An application management unit 604 for managing a plurality of dynamically-removable application groups is disposed on the upper level of the interpreter 603. The applications are managed by the application management unit 604 and realize various functions.

These applications cooperate with the MFP and provide various types of processing to a user. An application 609 and a log-in application 610 can be given as examples of the applications. The application 609 includes an application performing image processing and image compression, and an application performing divisional management such as print control, and the log-in application 610 performs logged in user management.

The log-in application 610 should not be suspended because the log-in application 610 may receive an inquiry on log-in context from an application at any timing during a log-in period.

The software module can operate an application module for providing a service of the MFP via the interpreter 603.

For example, the application management unit 604 adds the application 609 as a management target when the application installer 606 installs the application 609 in the MFP. Further, when the application 609 is deleted from the MFP, the application management unit 604 can remove the application 609 from the management target.

When the MFP is started, the application management unit 604 manages the start-up order of the application modules which provides various kinds of services. The application management unit 604 reads a service start-up order list 1000 (described below referring to FIG. 10) stored in the HDD/flash memory 304, and performs start-up processing according to the start-up order specified therein.

The application 609 and the log-in application 610 can store the setting information for operating themselves in an application setting value management DB service 608 (hereinafter, referred to as "DB service 608").

The DB service 608 serves as an application which manages an application setting value database 611. The setting value of the application is stored in the application setting value database 611. In addition, the DB service 608 is also registered to and managed by the application management unit 604.

When the application management unit 604 starts the application 609 and the log-in application 610, the application 609 and the log-in application 610 read their own setting information 500 from the DB service 608 at a certain stage after starting.

Thereafter, the application 609 and the log-in application 610 continue the start-up processing according to the read setting information 500. Since application IDs are included in the setting information 500, the application 609 and the log-in application 610 can refer to the application IDs and identify the corresponding setting information 500.

The application 609 and the log-in application 610 use the DB service 608 to operate the setting value of the application. The operation is equivalent to that of the application setting value database 611 managed by the DB service 608.

In response to a request of a setting value operation received from the management apparatus 110 via the network communication unit 605, the setting value operation service 607 operates the setting information of the application 609 and the log-in application 610. At this time, if the application 609 (operation target) is being executed, the setting value operation service 607 requests the application management unit 604 to suspend the execution of the application 609, and operates the setting value thereof after the execution of the application 609 is suspended.

On the other hand, as for the application such as the log-in application 610 whose execution thereof cannot be suspended, the setting value operation service 607 performs a reserved operation after a restart. The operation of the setting value operation service 607 will be described below in detail with reference to FIG. 8. In addition, the setting value operation service 607 is also registered to and managed by the application management unit 604.

Further, the setting value operation service 607 notifies that the application setting value has been operated to the application (such as the application 609).

If the application 609 is configured to respond to the notification from the setting value operation service 607, upon receipt of the notification therefrom, the application 609 can execute processing such as application setting value re-reading processing programmed to be executed after execution of the setting value operation.

As described above, the MFPs 120 and 130 can execute a plurality of programs including at least one application and the setting value operation service 607 for executing the setting value operation of the one application, and the application management unit 604 manages the start-up of these programs.

<Setting Value Operation Procedure Executed by Management Apparatus>

Figure 7:
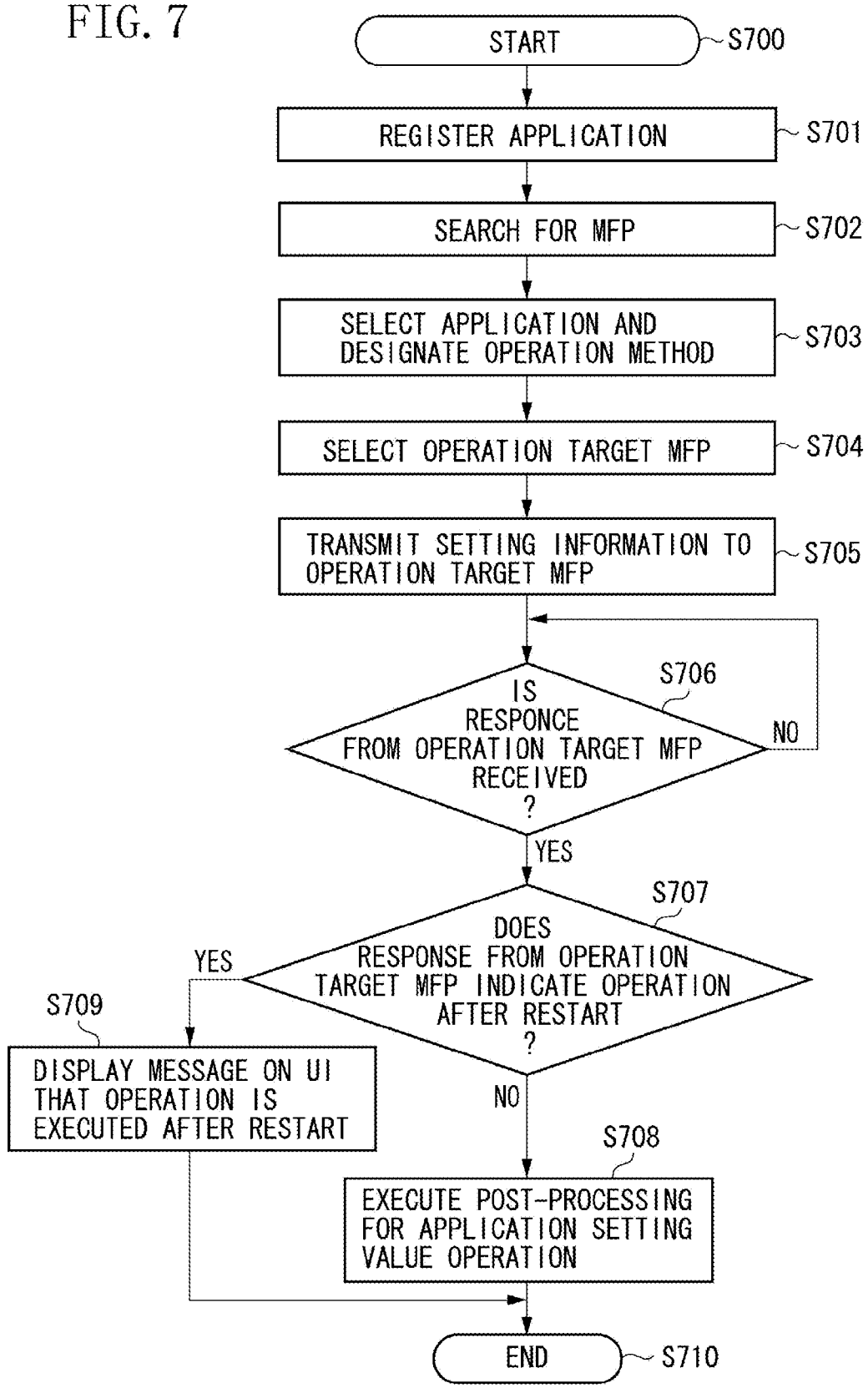
FIG. 7 is a flowchart illustrating an example of processing executed by the management apparatus 110.

FIG. 7 is a flowchart illustrating an example of processing executed by the management apparatus 110.

In order to operate a setting value of one or more applications installed in one or more multifunction peripherals, the CPU 201 of the management apparatus 110 executes a program whose steps are illustrated in the flowchart in FIG. 7. This program is stored in the storage unit 208 in a computer-readable manner.

In step S700 of FIG. 7, the processing of the flowchart is started when the UI control unit 401 starts the application management unit 402 by detecting the operation performed by the user. The operation performed by the user is, for example, a menu selection through the user interface (UI).

First, in step S701, the application management unit 402 receives a request for adding an application from a user via the UI control unit 401 and holds (registers) the requested application program or data in an application list of the application database 408. The application program or the data to be added thereto is supplied to the management apparatus 110 from a storage medium or a communication medium.

Next, in step S702, the device management unit 403 searches for the MFP connected to the network through the search unit 406. In addition, the device management unit 403 acquires detailed information of the searched MFPs via the communication unit 407, and holds (registers) the detailed information thereof in a device list of the device database 409.

Further, in step S703, the UI control unit 401 displays an application selection screen, and receives a user input such as selection of the application and designation of the operation method including distribution, acquisition, and deletion of the setting information.

When the selection of the application is input by the user, the UI control unit 401 transfers the input application selection information to the application management unit 402. The selected application is referred to as "target application". When the user inputs the designation of the operation method, the UI control unit 401 transfers the input information of the operation method for the application to the setting value management unit 405.

Based on the application selection information of the above-described application, the application management unit 402 identifies the application selected by the user and extracts the application information from the application database 408. The application management unit 402 temporarily stores the extracted application information in the RAM 203 or the storage unit 208. In addition, the setting value management unit 405 stores the information for the operation method of the application in the RAM 203 or the storage unit 208.

In step S704, the UI control unit 401 displays an MFP selection screen and receives a user input (selection of an MFP). When the user selects an MFP, the UI control unit 401 sends an input result (selection information of the MFP) to the device management unit 403. The selected MFP is referred to as a "target MFP".

The device management unit 403 identifies the MFP selected by the user based on the received input result, and extracts the information of the MFP selected by the user from the device database 409. The device management unit 403 temporarily stores the extracted information in the RAM 203 or the storage unit 208.

In step S705, the setting value management unit 405 transmits, to the MFP selected in step S704, a request for operating the application setting value selected in step S703 according to the operation method designated in step S703. The setting value management unit 405 transmits the request in the XML format as illustrated in FIG. 5. Through this operation, in the MFP, the setting value operation service 607 receives the request via the network communication unit 605, and executes the requested operation.

The above-described step S705 will be further described specifically. For example, in a case where "distribution" of the application setting value is executed with respect to the MFP if the distribution of the setting information is designated as the operation method, the setting value management unit 405 transmits the setting information 500 as illustrated in FIG. 5 to the setting value operation service 607 of the MFP.

This setting information 500 is stored in the application database 408 (for example, registered through the above-described processing in step S701). The setting value operation service 607 writes the received setting information 500 into the corresponding application setting value database 611.

Further, in a case where "acquisition" of the application setting value from the MFP is executed if the acquisition of the setting information is designated as the operation method, the setting value management unit 405 transmits a request for acquiring the setting information 500 to the setting value operation service 607 of the MFP.

In response to the request thereof, the setting value operation service 607 of the MFP reads the application setting information 500 of the target application, and transmits the application setting information thereof to the management apparatus 110. This application setting information 500 is associated with identification information for identifying the MFP and application identification information, and registered in the application database 408 of the management apparatus 110.

Further, in a case where "deletion" of the application setting value within the MFP is executed if the deletion of the setting information is designated as the operation method, the setting value management unit 405 transmits a request for deleting the setting information 500 to the setting value operation service 607 of the MFP. In response to the request thereof, the setting value operation service 607 of the MFP deletes the application setting value managed by the DB service 608.

When the setting information stored in the DB service 608 is changed, the setting value operation service 607 notifies the application that will be influenced by the change that the application setting value has been operated. The notified application reads the application setting value from the DB service 608 via the application management unit 604 as necessary.

The processing in step S706 and subsequent steps will be described below. In step S706, the setting management unit 405 waits for a response from the setting operation service 607 of the MFP to which the above-described request has been transmitted in step S705. If the setting value management unit 405 receives a response (YES in step S706), the processing proceeds to step S707. When the setting value operation service 607 of the MFP executes the operation according to the request, the setting value operation service 607 sends a response indicating that the operation has been executed and completed either in a normal state or an abnormal state. Then, in a case where the operation according to the request is executed after a restart, the setting value operation service 607 sends a status indicating that the operation is executed after the restart.

In step S707, the setting value management unit 405 determines whether the response for the request transmitted in step S705 received from the setting value operation service 607 of the MFP is a status indicating that the operation is executed after a restart.

If the setting value management unit 405 determines that the response for the request transmitted in step S705 received from the setting value operation service 607 of the MFP is not the status indicating that the operation is executed after a restart (NO in step S707), the processing proceeds to step S708.

In step S708, the setting value management unit 405 executes post-processing for the operation of the application setting information and, in step S710, ends the processing of the flowchart. In the post-processing, the setting value management unit 405 notifies the user of the status of the execution result via the UI control unit 401.

The response of the execution completion will be described specifically. For example, in a case where the content of the requested operation is "distribution" of the application setting information, the setting value management unit 405 receives a result of distribution of the application setting information from the MFP via the communication unit 407. The setting value management unit 405 stores the received result in the RAM 203 or the storage unit 208.

Further, in a case where the content of the requested operation is "acquisition" of the application setting information, the setting value management unit 405 receives a result of acquisition of the application setting information from the MFP via the communication unit 407. If the result of the acquisition is successful, the setting value management unit 405 also receives the application setting information. The setting value management unit 405 stores the received result in the RAM 203 or the storage unit 208. In addition, the setting value management unit 405 stores the received application setting information in the application database 408.

Furthermore, in a case where the content of the requested operation is "deletion" of the application setting information, the setting value management unit 405 receives via the communication unit 407 a result of deletion of the application setting information from the MFP. The setting value management unit 405 stores the received result in the RAM 203 or the storage unit 208.

In any of the operations of "distribution" of the setting information, "acquisition" of the setting information, and "deletion" of the setting information, the UI control unit 401 can presents the result thereof received and stored in the RAM 203 or the storage unit 208 to the user as necessary.

Next, description will be given to the processing performed when the response from the MFP is a status indicating that the operation is executed after a restart.

In step S707, if the setting value management unit 405 determines that the response for the request transmitted in step S705 received from the setting value operation service 607 of the MFP is the status indicating that the operation is executed after a restart (YES in step S707), the processing proceeds to step S709.

In step S709, as necessary, the setting value management unit 405 presents to the user via the UI control unit 401 that the operation will be executed after the restart. Thereafter, in step S710, the setting value management unit 405 ends the processing of the flowchart. In addition, in step S709, the UI control unit 401 may present a message for prompting the user to restart the MFP.

The flowchart illustrated in FIG. 7 has been described as the above.

Figure 8:
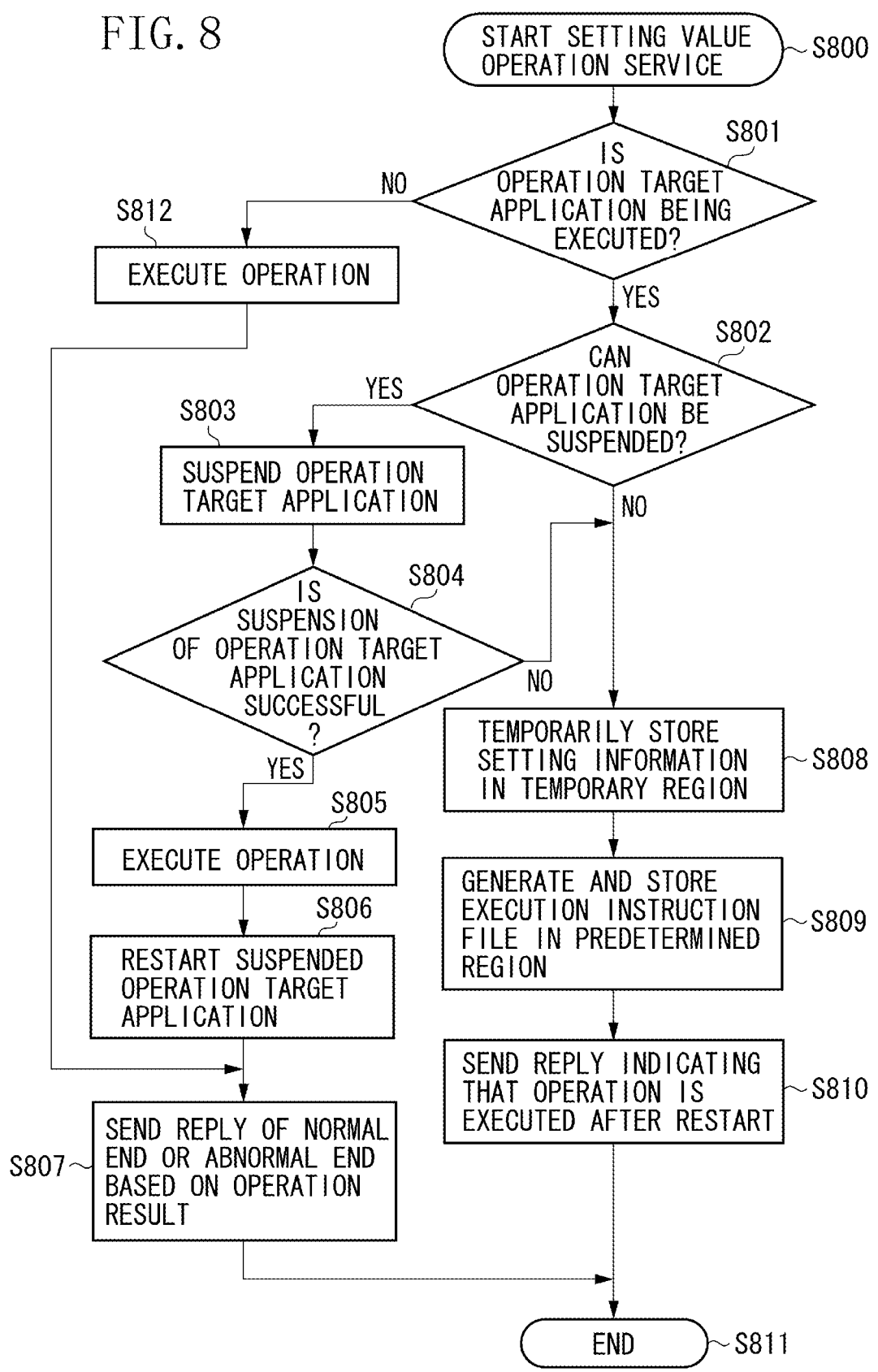
FIG. 8 is a flowchart illustrating an example operation performed by a setting value operation service 607 of the multifunction peripheral 120 when the management apparatus 110 requests an operation of distribution, deletion, or acquisition.

Referring to FIG. 8, an operation of the setting value operation service 607 of the MFP 120 will be described. This operation is performed when the management apparatus 110 requests the MFP 120 to perform an operation of distribution, deletion, or acquisition. FIG. 8 is a flowchart illustrating an example of the operation performed by the setting value operation service 607 of the MFP 120 when the management apparatus 110 requests the MFP 120 to perform the operation of distribution, deletion, or acquisition.

The processing illustrated in the flowchart is realized by the CPU 301 of the MFP 120 reading and executing a computer readable program stored in the HDD/flash memory 304.

In step S800, the processing of the flowchart is started when the setting value operation service 607 receives the setting information 500 in the XML format as illustrated in FIG. 5 via the network communication unit 605.

First, in step S801, the setting value operation service 607 determines whether the operation target application is being executed.

In a case where the setting value operation service 607 determines that the operation target application is suspended (NO in step S801), the processing proceeds step S812.

In step S812, the setting value operation service 607 executes the operation requested by the setting information 500.

Next, in step S807, depending on the execution result of the operation, the setting value operation service 607 transmits a status indicating either "normal end" or "abnormal end" to the management apparatus 110. Thereafter, in step S811, the setting value operation service 607 ends the processing of the flowchart.

On the other hand, in a case where the setting value operation service 607 determines that the operation target application is being executed (YES in step S801), the processing proceeds to step S802.

In step S802, the setting value operation service 607 determines whether the operation target application can be suspended.

<When Operation Target Application can be Suspended>

In a case where the setting value operation service 607 determines that the operation target application can be suspended (YES in step S802), the processing proceeds to step S803. In step S803, the setting value operation service 607 suspends the operation target application.

Next, in step S804, the setting value operation service 607 determines whether the suspension of the operation target application is successful.

In a case where the setting value operation service 607 determines that the suspension of the operation target application is successful (YES in step S804), the processing proceeds to step S805.

In step S805, the setting value operation service 607 executes the operation requested by the setting information 500. After executing the operation in step S805, in step S806, the setting value operation service 607 restarts the operation target application that has been suspended in step S803.

Next, in step S807, depending on the execution result of the operation, the setting value operation service 607 transmits a status indicating either "normal end" or "abnormal end" to the management apparatus 110. Thereafter, in step S811, the setting value operation service 607 ends the processing of the flowchart.

On the other hand, in a case where the setting value operation service 607 determines that the suspension of the operation target application is unsuccessful (NO in step S804), the processing proceeds to step S808, and the processing proceeds to the processing described below that is performed when the operation target application should be suspended.

<When Operation Target Application should not be Suspended or is Unsuccessful to be Suspended>

Processing performed for an operation target application that should not be suspended will be described while the log-in application 610 is taken as an example thereof.

In step S802, when the setting value operation service 607 determines that the operation target application should not be suspended (NO in step S802), the processing proceeds to step S808. In step S808, the setting value operation service 607 temporarily stores the setting information 500 in a temporary region of the HDD/flash memory 304.

Next, in step S809, the setting value operation service 607 generates a post-restart execution instruction file 900 (hereinafter, simply referred to as "execution instruction file 900") in the HDD/flash memory 304.

The execution instruction file 900 is execution instruction information for executing the requested operation when the MFP 120 is restarted. Therefore, the execution instruction file 900 is generated in a specific storage region which the application management unit 604 can refer to when the restart processing of the MFP 120 is performed. The content of the execution instruction file 900 will be described below with reference to FIG. 9.

Next, in step S810, the setting value operation service 607 transmits a status indicating that the operation is executed after a restart to the management apparatus 110, and, in step S811, ends the processing of the flowchart.

In addition, in step S810, the setting value operation service 607 may be configured to further transmit a message prompting the management apparatus 110 (i.e., operation request source) to restart the MFP 120.

The flowchart illustrated in FIG. 8 has been described above. An operation performed when the MFP 120 is restarted will be described below with reference to FIG. 11.

Figure 9:
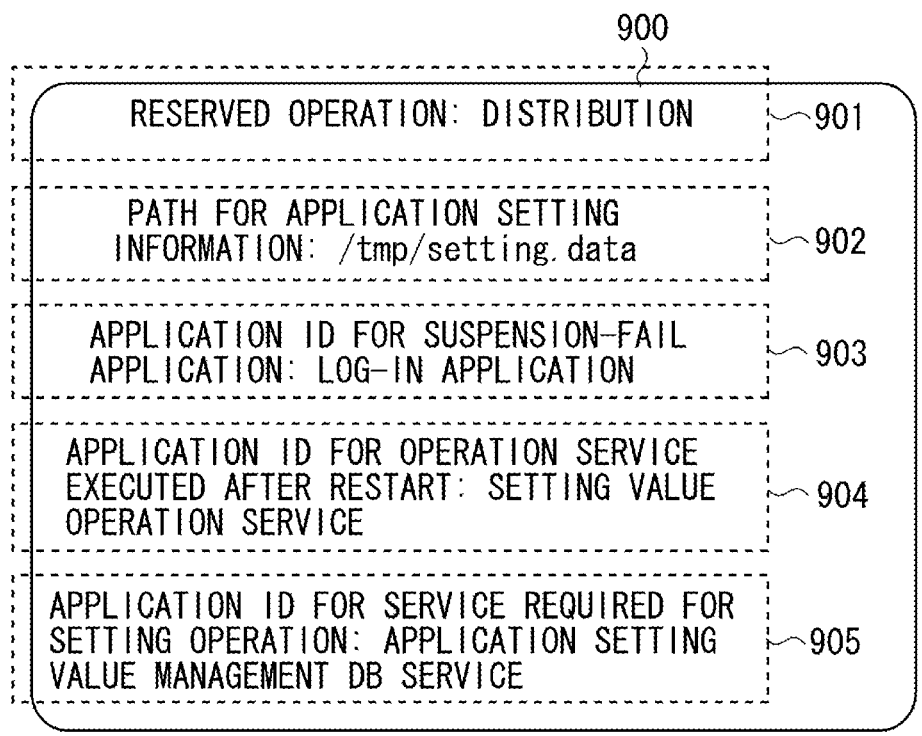
FIG. 9 is a diagram illustrating an example execution instruction file 900 when the operation content is "distribution".

FIG. 9 is a diagram illustrating an example of the execution instruction file 900 when the operation content is "distribution". The format of the execution instruction file 900 illustrated in FIG. 9 corresponds to that when the operation content is either "distribution" or "deletion". The execution instruction file when the operation content is "acquisition" will be described below with reference to FIG. 16.

In FIG. 9, a reserved operation 901 indicates an operation content to be executed after a restart. If the operation content is "distribution", "distribution" is described. If the operation content is "deletion", "deletion" is described.

A path 902 indicates a path for the setting information 500 temporarily stored in the temporary region of the HDD/flash memory 304 in step S808 of FIG. 8. In FIG. 9, ":/tmp/setting.data" is described as the path information.

An application ID 903 indicates an application ID for the application that should not be suspended or the application failed in being suspended. In FIG. 9, "log-in application" is described as the application failed in being suspended.

An operation execution service 904 describes an application ID for the operation execution service after a restart. In the present exemplary embodiment, "setting value operation service" is described because the setting value operation service 607 executes an operation after a restart.

An application ID 905 indicates an application ID for the service required to perform a setting operation. In the present exemplary embodiment, "application setting value management DB service" is described because the DB service 608 is required to perform the distribution operation.

Figure 10:
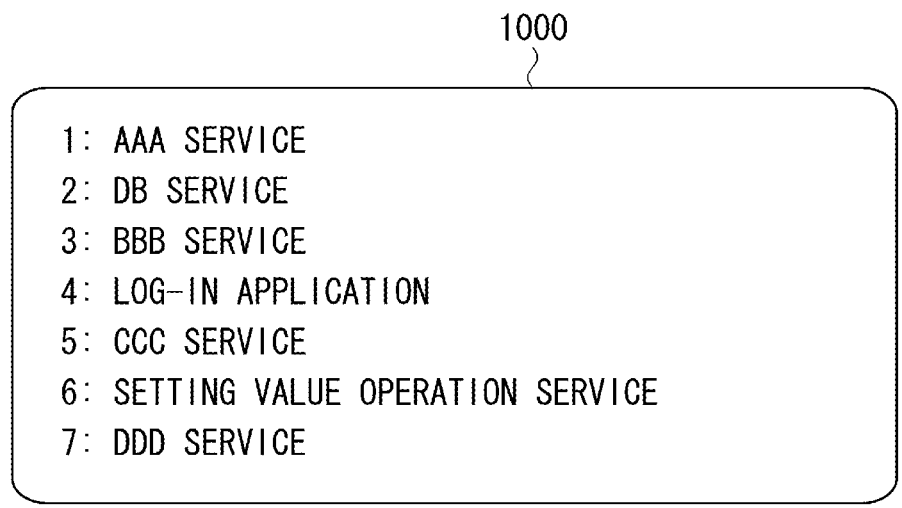
FIG. 10 is a diagram illustrating an example service start-up order list when the multifunction peripheral 120 is started.

FIG. 10 is a diagram illustrating an example of a start-up order list of the service when the MFP 120 is restarted.

In FIG. 10, a service start-up order list 1000 is stored in the HDD/flash memory 304. The application management unit 604 starts the services according to the start-up order described in the service start-up order list 1000.

In the example illustrated in FIG. 10, the application management unit 604 starts the DB service 608 (corresponding to the application ID 905 of the execution instruction file 900), the log-in application 610 (corresponding to the application ID 903 of the execution instruction file 900), and the setting value operation service 607 (corresponding to the operation execution service 904 of the execution instruction file 900) in start-up order of the second, the fourth, and the sixth respectively.

Figure 11:
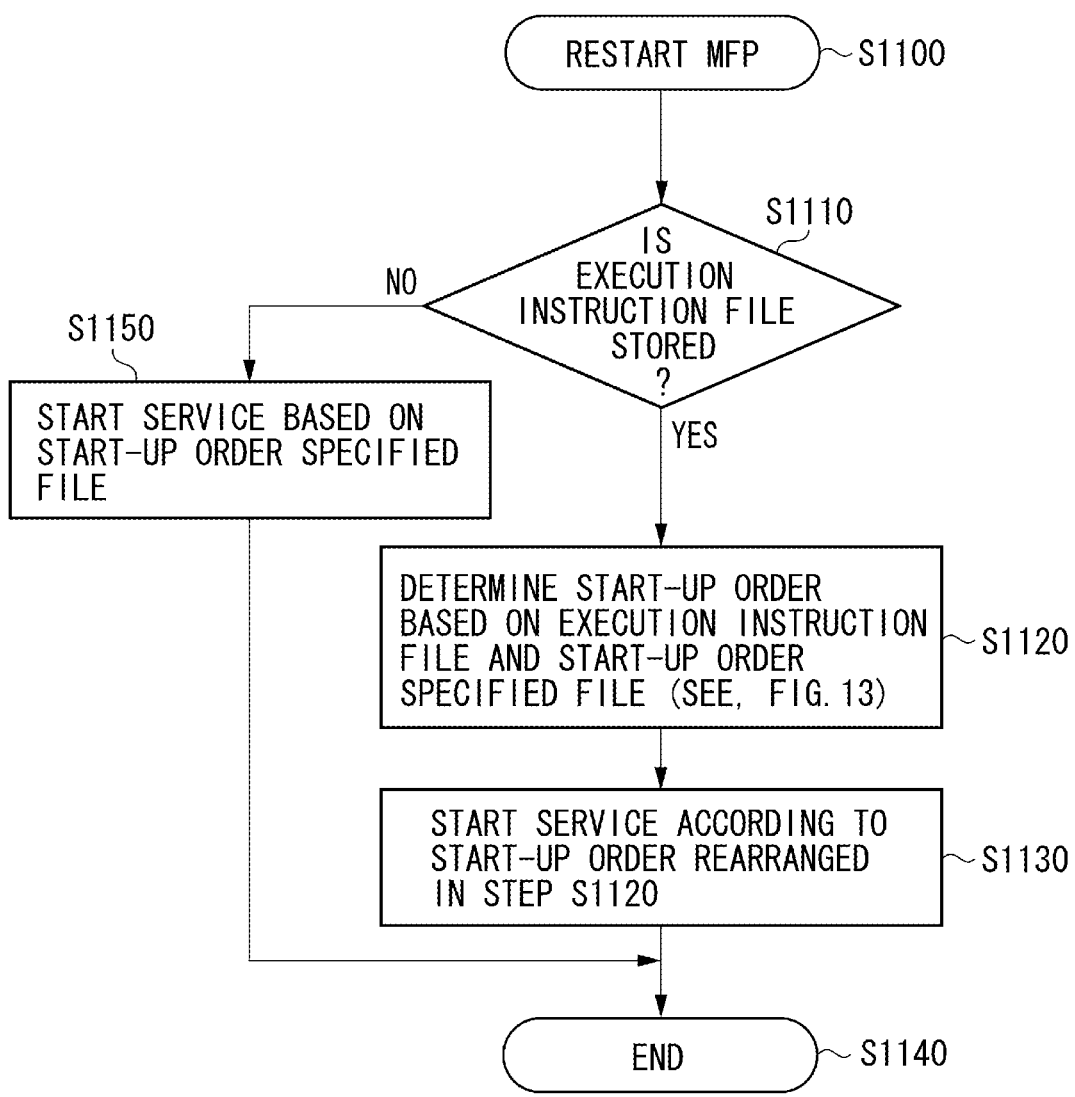
FIG. 11 is a flowchart illustrating an operation example of an application management unit 604 performed when the multifunction peripheral 120 is restarted in a case where the operation target application is should not be suspended or suspension thereof has failed.

Referring to FIG. 11, an operation of the application management unit 604 will be described below. This operation is performed when the MFP 120 is restarted after the processing illustrated in FIG. 8 in which the processing ends in step S811 via the processing in step S808 through step S810 when the operation target application is determined that it should not be suspended (NO in step S802) or unsuccessful in being suspended (NO in step S804).

FIG. 11 is a flowchart illustrating an example operation of the application management unit 604. This operation is executed when the MFP 120 is restarted because the operation target application should not be suspended or failed in being suspended. The processing illustrated in the flowchart is realized by the CPU 301 of the MFP 120 reading and executing a computer readable program stored in the HDD/flash memory 304.

In step S1100, the MFP 120 is restarted to start the processing of the flowchart.

In step S1110, the application management unit 604 determines whether the execution instruction file 900 is stored in the HDD/flash memory 304. If the application management unit 604 determines that the execution instruction file 900 is not stored (NO in step S1110), the processing proceeds to step S1150.

In step S1150, the application management unit 604 starts the services according to the start-up order specified in the service start-up order list 1000. Thereafter, in step S1140, the application management unit 604 ends the processing of the flowchart.

On the other hand, in a case where the application management unit 604 determines that the execution instruction file 900 is stored (YES in step S1110), the processing proceeds to step S1120.

Figure 13:
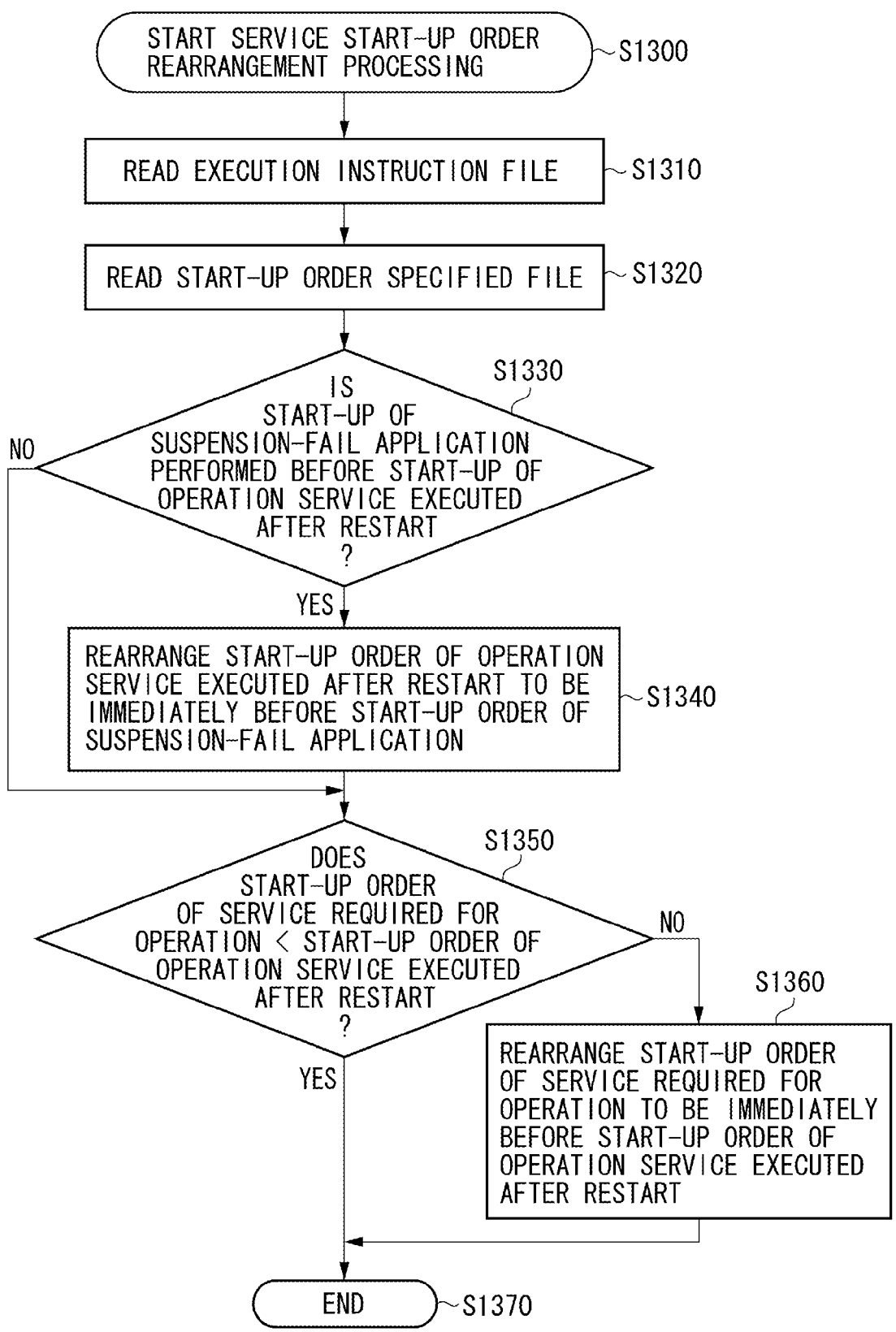
FIG. 13 is a flowchart illustrating an example of service start-up order rearrangement processing performed by the application management unit 604 in step S1120 of FIG. 11 when the multifunction peripheral 120 is restarted.

In step S1120, based on the execution instruction file 900 and the service start-up order list 1000, the application management unit 604 rearranges the service start-up order according to the algorithm illustrated in FIG. 13. Thereafter, the application management unit 604 stores the rearranged service start-up order in the RAM 303.

Next, in step S1130, the application management unit 604 sequentially starts the services according to the new start-up order rearranged in step S1120. The operation of the started application will be described below with reference to FIG. 12.

When the start-up processing of all the services are completed, in step S1140, the application management unit 604 ends the processing of the flowchart.

The operation of the application started in step S1130 of FIG. 11 will be described with reference to FIG. 12.

Figure 12:
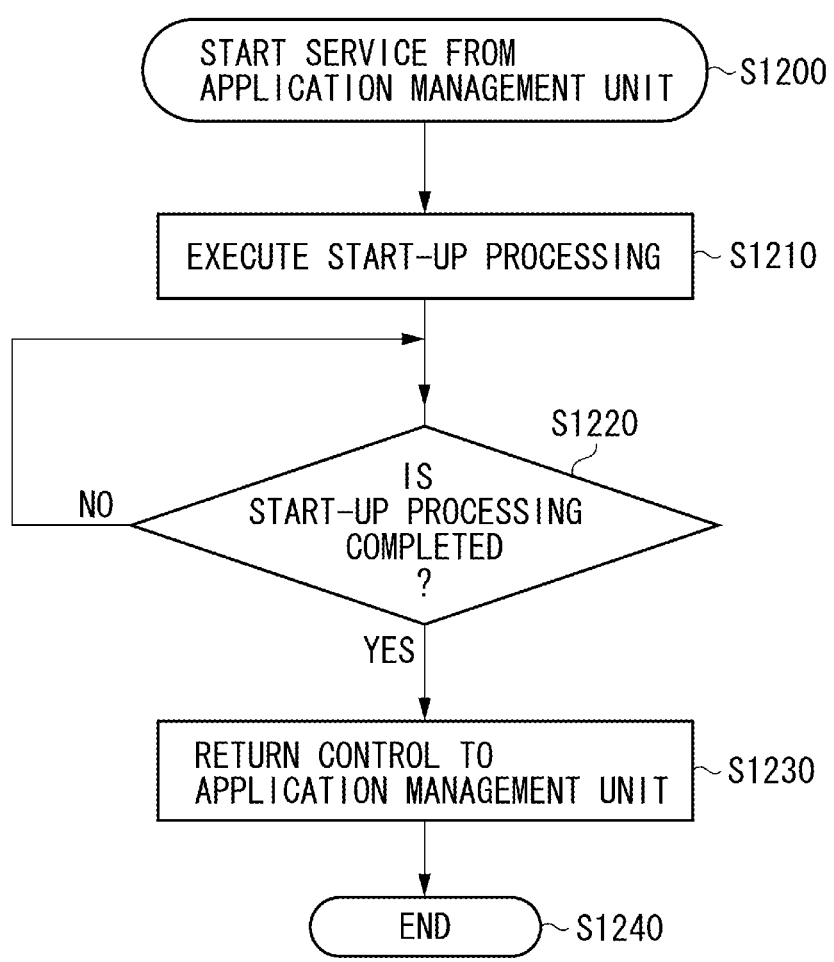
FIG. 12 is a flowchart illustrating an example of application start-up processing performed in step S1130 of FIG. 11.

FIG. 12 is a flowchart illustrating an example of the start-up processing of the application started in step S1130 of FIG. 11. The processing illustrated in the flowchart is realized by the CPU 301 of the MFP 120 reading and executing a computer readable program stored in the HDD/flash memory 304.

In step S1200, the application management unit 604 starts the service. In step S1210, the started service (hereinafter, referred to as "the application") executes the start-up processing. The start-up processing of the application corresponds to initialization processing. In addition, the start-up processing for the setting value operation service 607 after a restart will be described below with reference to FIG. 15.

Next, in step S1220, the application determines whether the start-up processing executed in step S1210 has been completed. If the application determines that the start-up processing has not been completed (NO in step S1220), the application repeats the determination processing in step S1220.

On the other hand, if the application determines that the start-up processing has been completed (YES in step S1220), the processing proceeds to step S1230. In step S1230, the application returns control to the application management unit 604. When the control is returned to the application management unit 604, the application management unit 604 starts the next service. The start-up processing for the application has been described above.

Referring to FIG. 13, the algorithm of the service start-up order rearrangement will be described. The algorithm thereof is performed by the application management unit 604 in step S1120 of FIG. 11 after the MFP 120 has been restarted.

FIG. 13 is a flowchart illustrating an example of service start-up order rearrangement processing performed by the application management unit 604 in step S1120 of FIG. 11 after the MFP 120 has been restarted. The processing illustrated in the flowchart is realized by the CPU 301 of the MFP 120 reading and executing a computer readable program stored in the HDD/flash memory 304.

In step S1300, the application management unit 604 starts the service start-up order rearrangement processing. In step S1310, the application management unit 604 reads the execution instruction file 900. Further, in step S1320, the application management unit 604 reads the service start-up order list 1000.

Next, in step S1330, the application management unit 604 compares the start-up order of the application that cannot be suspended (identified by the application ID 903 of the execution instruction file 900) with the start-up order of the operation execution service after a restart (identified by the operation execution service 904 of the execution instruction file 900). Then, the application management unit 604 determines whether the start-up order of the application that cannot be suspended is smaller than (the start-up order thereof is before) the start-up order of the operation execution service after a restart.

If the application management unit 604 determines that the start-up order of the application that cannot be suspended is smaller than (the start-up order thereof is before) the start-up order of the operation execution service after a restart (YES in step S1330), the processing proceeds to step S1340.

In step S1340, the application management unit 604 rearranges the start-up order of the operation execution service after a restart to be immediately before the start-up order of the application that cannot be suspended. Thereafter, the processing proceeds to step S1350.

On the other hand, in step S1330, if the application management unit 604 determines that the start-up order of the application that cannot be suspended is greater than (i.e., the start-up order thereof is after) the start-up order of the service executing the operation after restart (NO in step S1330), the processing directly proceeds to step S1350.

In step S1350, the application management unit 604 compares the start-up order of the service required for the operation (identified by the application ID 905 of the execution instruction file 900) with the start-up order of the operation execution service after a restart (identified by the operation execution service 904 of the execution instruction file 900). Then, the application management unit 604 determines whether the start-up order of the service required for the operation is smaller than (the start-up order thereof precedes) the start-up order of the operation execution service after a restart.

Then, if the application management unit 604 determines that the start-up order of the service required for the operation is smaller than (the start-up order thereof is before) the start-up order of the operation execution service after the restart (YES in step S1350), the processing directly proceeds to step S1370 to end the processing of the flowchart.

On the other hand, if the application management unit 604 determines that the start-up order of the service required for the operation is greater than (the start-up order thereof is after) the start-up order of the operation execution service after the restart (NO in step S1350), the processing proceeds to step S1360.

In step S1360, the application management unit 604 rearranges the start-up order of the service required for the operation to be immediately before the start-up order of the operation execution service after the restart. Thereafter, the processing proceeds to step S1370 to end the processing of the flowchart.

As described above, when the MFP 120 is restarted, the application management unit 604 changes the start-up order of the services according to the execution instruction file 900. Through the change, the start-up setting value operation service 607 is to be performed before the start-up of the operation target application.

Further, in a case where another program is required for the setting value operation service 607 to operate the setting value, the application management unit 604 changes the start-up order of the services so that the start-up of another program (for example, the DB service 608) is performed before the start-up of the setting value operation service 607.

Figure 14:
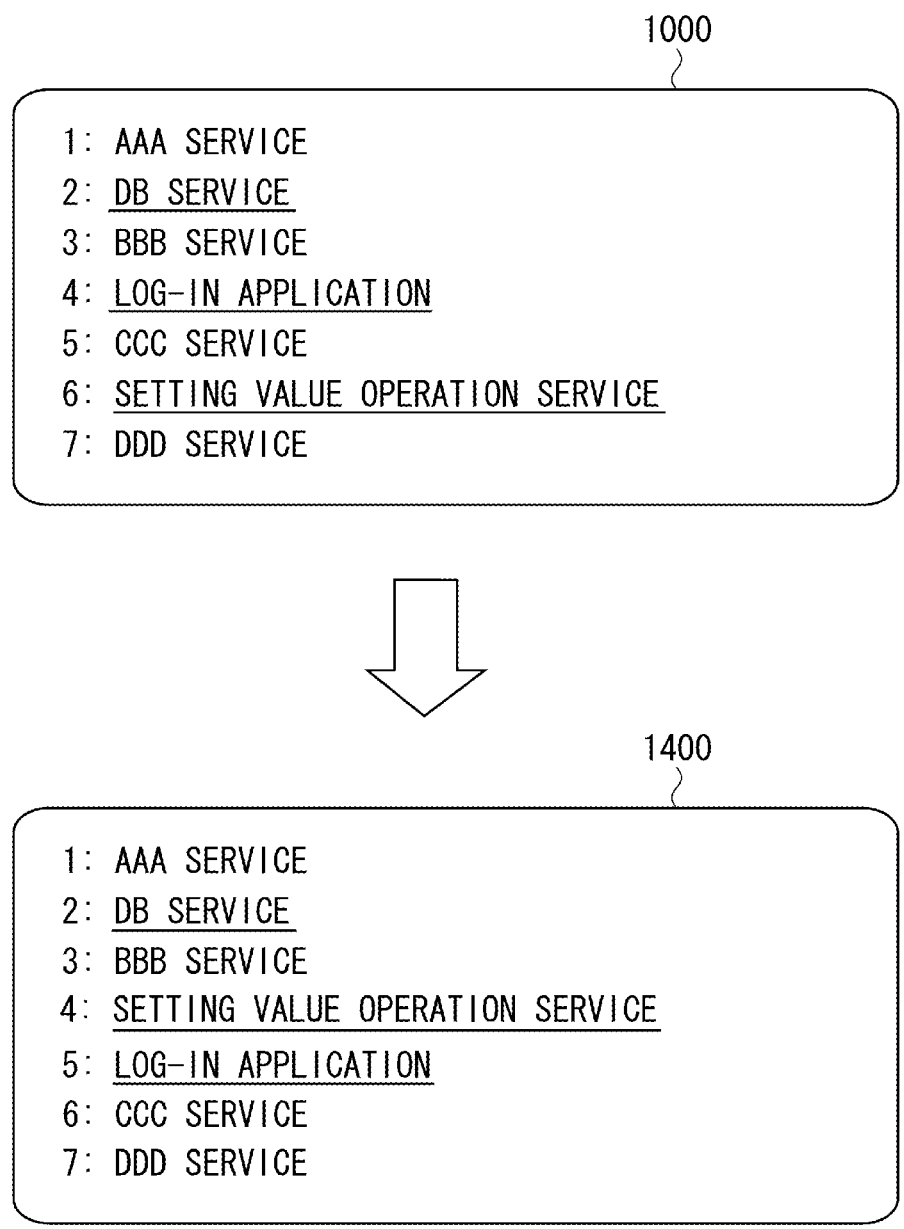
FIG. 14 is a diagram illustrating a rearrangement result of the start-up order performed using the start-up order rearrangement algorithm illustrated in FIG. 13.

Referring to FIG. 14, how the start-up order rearrangement algorithm illustrated in FIG. 13 specifically changes the start-up order of the services according to the present exemplary embodiment will be described.

FIG. 14 is a diagram illustrating a rearrangement result of the start-up order arranged by the start-up order rearrangement algorithm illustrated in FIG. 13.

In FIG. 14, the service start-up order list 1000 indicates an initial service start-up order. The initial service start-up order list 1000 is the same as the service start-up order list 1000 illustrated in FIG. 10.

In the initial service start-up order list 1000, as illustrated in FIGS. 9 and 10, the start-up order of the log-in application 610 corresponding to the application ID 903 for the service that cannot be suspended is indicated as "4", the start-up order of the setting value operation service 607 corresponding to the operation execution service 904 to be performed after the restart is indicated as "6", and the start-up order of the DB service 608 corresponding to the application ID 905 for the service required for the operation is indicated as "2".

Therefore, through the processing in step S1330 of FIG. 13, the application management unit 604 determines that the start-up order "4" of the log-in application 610 corresponding to the application ID 903 is smaller than the start-up order "6" of the setting value operation service 607 corresponding to the operation execution service 904 (YES in step S1330). Accordingly, as indicated in step S1340, the application management unit 604 changes the start-up order thereof to rearrange the start-up order of the setting value operation service 607 to be immediately before the start-up order of the log-in application 610. At this point, the start-up order of the setting value operation service 607 becomes "4" whereas the start-up order of the log-in application 610 becomes "5".

Further, through the processing in step S1350 of FIG. 13, the application management unit 604 determines that the start-up order "2" of the DB service 608 corresponding to the application ID 905 is smaller than the start-up order "4" of the setting value operation service 607 corresponding to the operation execution service 904 (YES in step S1350). Therefore, in step S1370, the application management unit 604 ends the processing without changing the start-up order thereof. As a result, the start-up order of the services is changed as illustrated in a service start-up order list 1400.

Consequently, in step S1130 of FIG. 11, the application management unit 604 starts the services according to the start-up order indicated in the service start-up order list 1400.

As a result, the setting value operation service 607 corresponding to the operation execution service 904 is started before the log-in application 610 corresponding to the application ID 903 for the application that could not be suspended. In addition, the DB service 608 corresponding to the application ID 905, which is the service required for the setting operation, is started before the setting value operation service 607 corresponding to the operation execution service 904.

An operation of the start-up processing of the setting value operation service 607 described in the operation execution service 904 after restart will be described with reference to FIG. 15. In the description, a distribution operation and a deletion operation will be described as setting value operations, whereas an acquisition operation will be described below.

Figure 15:
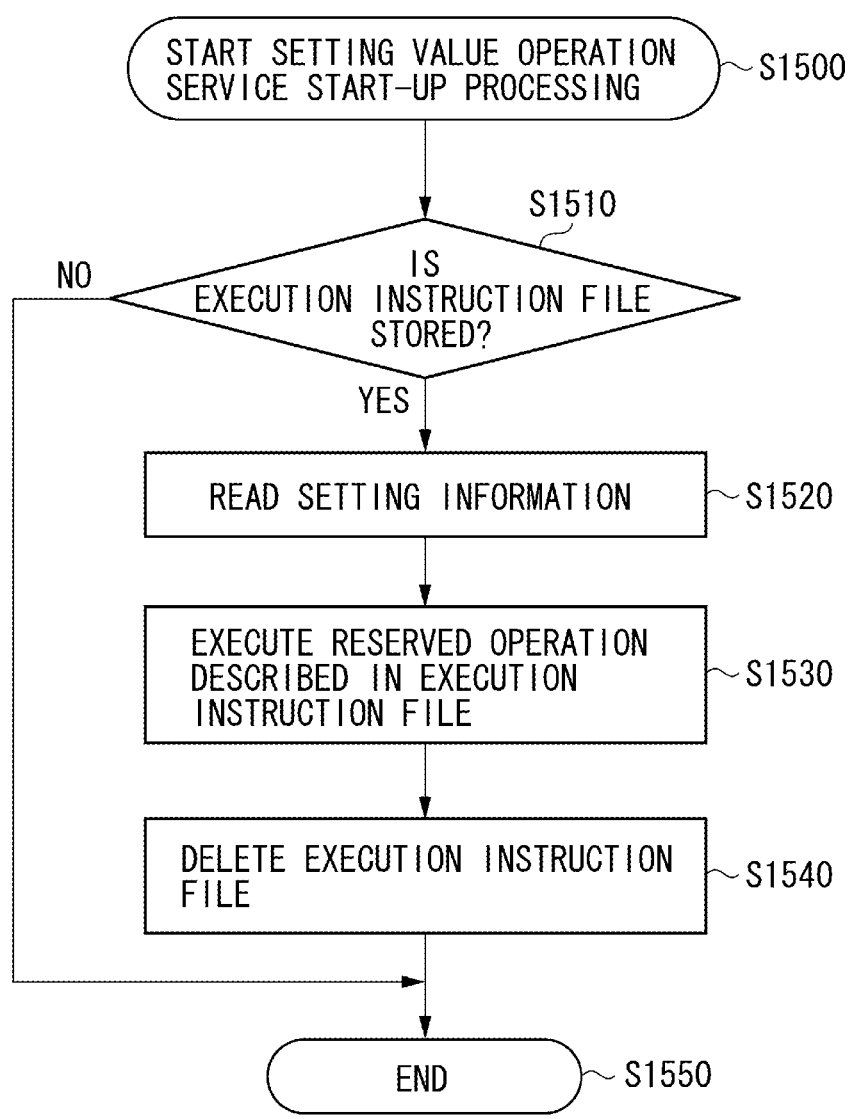
FIG. 15 is a flowchart illustrating an operation example of start-up processing of the setting value operation service 607 described in an operation execution service 904 for a service executing an operation after restart.

FIG. 15 is a flowchart illustrating an example operation of the start-up processing of the setting value operation service 607 described in the operation execution service 904 for the service executing the operation after restart. The processing illustrated in the flowchart is realized by the CPU 301 of the MFP 120 reading and executing a computer readable program stored in the HDD/flash memory 304.

In step S1500, the start-up processing of the setting value operation service 607 is started. In step S1510, the setting value operation service 607 determines whether the execution instruction file 900 is stored in the HDD/flash memory 304.

If the setting value operation service 607 determines that the execution instruction file 900 is stored therein (YES in step S1510), the processing proceeds to step S1520.

In step S1520, the setting value operation service 607 reads a path for the setting information 500 (path 902 for application setting information) described in the execution instruction file 900, and reads the setting information 500 according to the path 902.

Next, in step S1530, the setting value operation service 607 reads and executes the reserved operation 901 described in the execution instruction file 900. In a case where the reserved operation 901 is described as "distribution", the setting value operation service 607 writes the setting information into the corresponding application setting information according to the setting information 500 read in step S1520.

In addition, in a case where the reserved operation 901 is described as "deletion", the setting value operation service 607 deletes the setting information through the DB service 608 according to the setting information 500 read in step S1520. Description will be given below for the case of which the reserved operation 901 is described as "acquisition".

After executing the reserved operation 901 in step S1530, the processing proceeds to step S1540. In step S1540, the setting value operation service 607 deletes the execution instruction file 900. Thereafter, in step S1550, the setting value operation service 607 ends the processing of the flowchart. In addition, the setting value operation service 607 may delete the setting information 500 in step S1540.

On the other hand, if the setting value operation service 607 determines that the execution instruction file 900 is not stored (NO in step S1510), the setting value operation service 607 simply ends the processing of the flowchart in step S1550.

As described above, according to the present exemplary embodiment, in a case where the distribution or deletion operation of the setting value for the application that should not be suspended is executed, the distribution or deletion operation thereof is executed before starting the application that should not be suspended when the MFP 120 has been restarted. This enables the operation to be executed safely and reliably.

<Acquisition Operation>

Difference between the setting value acquisition operation and the above-described setting value distribution operation or deletion operation of the application will be described. When the acquisition operation of the setting value is executed, contents of items in an execution instruction file for the acquisition operation is different from the contents of items for the distribution operation or deletion operation in the execution instruction file 900 of FIG. 9. The differences will be described with reference to FIG. 16.

Figure 16:
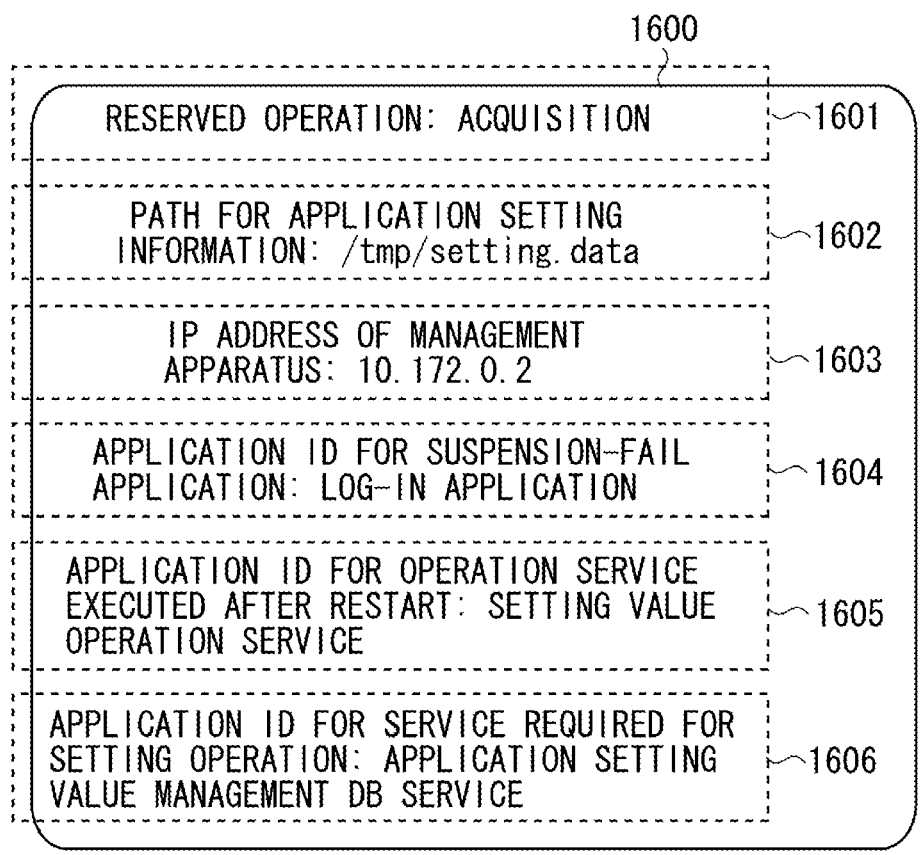
FIG. 16 is a diagram illustrating an example of an execution instruction file in an acquisition operation.

FIG. 16 is a diagram illustrating an example of the execution instruction file for the acquisition operation. FIG. 16 illustrates an execution instruction file 1600 for the acquisition operation of the application setting value. Similar to the reserved operation 901 of FIG. 9, a reserved operation 1601 indicates reserved operation content that is to be executed after a restart. When the reserved operation content is "acquisition", the reserved operation 1601 describes "acquisition".

Similar to the path 902 of FIG. 9, a path 1602 describes a path for the setting information 500 temporarily stored in the temporary region of the HDD/flash memory 304 in step S808 of FIG. 8. In the diagram of FIG. 16, ":/tmp/setting.data" is described as the path thereof.

An IP address 1603 describes an IP address of the management apparatus 110 that gives an instruction for executing the acquisition operation. This IP address 1603 is the item different from the items for the distribution operation or the deletion operation.

Similar to the application ID 903 in FIG. 9, an application ID 1604 describes an application ID for the application that should not be suspended or failed in being suspended. In FIG. 16, "log-in application" is described as the application failed in being suspended. Similar to the operation execution service 904 in FIG. 9, an application ID 1605 describes an application ID of the operation execution service 1606 after a restart.

In the present exemplary embodiment, "setting value operation service" is described because the setting value operation service 607 executes the operation after a restart. Similar to the application ID 905 in FIG. 9, an operation execution service 1606 describes a service required for a setting operation. In the present exemplary embodiment, "application setting value management DB service" is described because the DB service 608 is required for the acquisition operation.

Based on the content described in the execution instruction file 1600, the start-up processing for the setting value operation service 607 after restarting the MFP 120, which is illustrated in FIG. 15, is executed. The operation of the setting value operation service 607 will be described below.

In step S1500, the start-up processing of the setting value operation service 607 is started. In step S1510, the setting value operation service 607 determines whether the execution instruction file 1600 is stored in the HDD/flash memory 304. This processing is performed in a similar manner as the processing in the distribution or deletion operation.

In a case where the setting value operation service 607 determines that the execution instruction file 1600 is stored therein (YES in step S1510), the processing proceeds to step S1520. This processing is performed in a similar manner as the processing in the distribution or deletion operation.

In step S1520, the setting value operation service 607 reads a path for the setting information 500 (path 1602 for the application setting information) described in the execution instruction file 1600, and reads the setting information 500 according to the path. This processing is performed in a similar manner as the processing in the distribution or deletion operation.

Next, in step S1530, the setting value operation service 607 reads and executes the reserved operation 1601 described in the execution instruction file 1600.

In a case where the reserved operation 1601 is described as "acquisition", according to the setting information 500 read in step S1520, the setting value operation service 607 transmits the information of the application setting value acquired from the MFP 120 to the management apparatus 110 whose IP address is described in the IP address 1603 of the execution instruction file 1600 as the IP address of the apparatus who requests the acquisition operation.

After executing the reserved operation in step S1530, in step S1540, the setting value operation service 607 deletes the execution instruction file 1600. Thereafter, in step S1550, the setting value operation service 607 ends the processing of the flowchart. This processing is performed in a similar manner as the processing in the distribution or deletion operation.

In a case where the setting value operation service 607 determines that the execution instruction file 1600 is not stored therein (NO in step S1510), the setting value operation service 607 simply ends the processing of the flowchart in step S1550. This processing is performed in a similar manner as the processing in the distribution or deletion operation.

As described above, in a case where the acquisition operation of the setting value for the application that should not be suspended is executed, the acquisition operation thereof is executed before starting the application that should not be suspended when the MFP 120 has been restarted. This enables the operation to be executed safely and reliably.

In the present exemplary embodiments, the setting value operation of the application installed in the image forming apparatus has been described. However, the present exemplary embodiments can be applied to an electronic device other than the image forming apparatus.

As described above, according to the present exemplary embodiment, the operations (distribution, acquisition, and deletion) of the setting value for the application that should not be suspended or failed in being suspended can be executed safely and reliably.

Accordingly, this enables the management apparatus 110 to safely and reliably execute the operations such as distribution, acquisition, and deletion of various kinds of setting values of the application programs installed in one or more MFPs connected to the network.

Further, in the present exemplary embodiment, a configuration in which the management apparatus 110 requests the MFP to operate the setting information of the application installed therein has been described. However, even in a case where the operation unit 318 of the MFP requests the MFP to operate the setting information of the application installed therein, the MFP may execute the operation of the setting information through the same processing as described above.

In addition, in a case where the request for the operation of the setting information of the application is input through the web site provided for the MFP, the MFP may execute the operation of the setting information through the same processing as described above.

In the present exemplary embodiment, an operation for setting a setting value to the setting item of the application (distribution operation), an operation for acquiring a setting value set to the setting item of the application (acquisition operation), and an operation for deleting the setting value set to the setting item of the application (deletion operation) have been described as the operations of the setting information for the application.

However, the management apparatus 110, the operation unit 318, or the web site may also request a combined operation in which some of the above operations are combined into one operation, in addition to the request of any one of the above operations. In other words, the management apparatus 110, the operation unit 318, or the web site may request the MFP to execute the operation in which any of the two or all of the distribution operation, the acquisition operation, and the deletion operation are combined into one.

As described above, in the MFP, the setting value operation of the application that should not be suspended or failed in being suspended can be executed safely and reliably.

Further, the configuration and content of the above-described various types of data is not limited thereto, and thus the configuration and the content thereof may be configured in various ways according to the use or purpose thereof.

Although one preferred exemplary embodiment according to the present invention has been described above, the exemplary embodiment of the present invention may be realized as, for example, a system, an apparatus, a method, a program, or a storage medium. Specifically, the exemplary embodiment may be applied to a system configured of a plurality of devices, or an apparatus configured of a single device.

Furthermore, any configurations in which each of the above exemplary embodiments is combined with each other may be included in the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-048856 filed Mar. 6, 2012, which is hereby incorporated by reference herein in its entirety.

What is claimed is:

1. An image forming apparatus capable of executing a plurality of programs including at least one application and a setting value operation service for executing a setting value operation of the application, the image forming apparatus comprising:
   a determination unit configured to determine whether the application serving as an operation target can be suspended when an operation of a setting value of the application is requested;
   a reservation unit configured to store the requested operation content in a non-volatile storage region and store execution instruction information, which is used to perform the requested operation at a restart of the image forming apparatus, in a non-volatile storage region readable during the restart processing, in a case where the determination unit determines that the operation target application cannot be suspended; and
   a change unit configured to change start-up order of the program according to the execution instruction information so that the setting value operation service is performed before the operation target application when the image forming apparatus is restarted,
   wherein when the image forming apparatus is restarted, the setting value operation service is started and operates a setting value of the operation target application according to the operation content.

2. The image forming apparatus according to claim 1, wherein the setting value operation service deletes the execution instruction information after operating the setting value of the operation target application.

3. The image forming apparatus according to claim 1, further comprising:
   a notification unit configured to notify an operation requesting source of a notice for prompting the operation requesting source to restart the image forming apparatus, in a case where the reservation unit stores the execution instruction information.

4. The image forming apparatus according to claim 1, wherein in a case where another program is required for the setting value operation service to operate the setting value, the change unit changes the start-up order so that the start-up of the another program is performed before the start-up of the setting value operation service.

5. The image forming apparatus according to claim 1, wherein in a case where the determination unit determines that the operation target application can be suspended, the operation target application is suspended, and the setting value operation service operates the setting value of the operation target application.

6. The image forming apparatus according to claim 5, wherein the suspended operation target application is started when the setting value operation service has completed the operation of the setting value.

7. The image forming apparatus according to claim 5, wherein in a case where suspension of the operation target application fails, the reservation unit stores the requested operation content in a non-volatile storage region and stores execution instruction information, which is used for performing the requested operation at the restart of the image forming apparatus, in a non-volatile storage region readable during the restart processing.

8. The image forming apparatus according to claim 1, wherein in a case where the operation of a setting value of the application is requested while the operation target application is being suspended, the setting value operation service operates the setting value of the suspended operation target application.

9. The image forming apparatus according to claim 1, wherein the operation of the setting information of the application includes at least one of: an operation for setting a setting value to a setting item of the application, an operation for acquiring a setting value set to a setting item of the application, and an operation for deleting a setting value set to a setting item of the application.

10. A control method for an image forming apparatus capable of executing a plurality of programs including at least one application and a setting value operation service for executing an operation of a setting value of the application, the control method comprising:

determining whether an application serving as an operation target can be suspended in a case where an operation of a setting value of the application is requested;

storing the requested operation content in a non-volatile storage region and storing execution instruction information for executing the requested operation in a non-volatile storage region readable during restart processing when the image forming apparatus is restarted, in a case where it is determined that the application serving as the operation target cannot be suspended; and changing start-up order of the program according to the execution instruction information so that start-up of the setting value operation service is performed before start-up of the operation target application when the image forming apparatus is restarted, wherein when the image forming apparatus is restarted, the setting value operation service is started and operates the setting value of the operation target application according to the operation content.

11. A computer readable storage medium on which is stored a computer program for making a computer execute a method for an image forming apparatus capable of executing a plurality of programs including at least one application and a setting value operation service for executing an operation of a setting value of the application, the method comprising:

determining whether an application serving as an operation target can be suspended in a case where an operation of a setting value of the application is requested;

storing the requested operation content in a non-volatile storage region and storing execution instruction information for executing the requested operation in a non-volatile storage region readable during restart processing when the image forming apparatus is restarted, in a case where it is determined that the application serving as the operation target cannot be suspended; and changing start-up order of the program according to the execution instruction information so that start-up of the setting value operation service is performed before start-up of the operation target application when the image forming apparatus is restarted, wherein when the image forming apparatus is restarted, the setting value operation service is started and operates the setting value of the operation target application according to the operation content.

* * * * *